United States Patent
Bellers

(10) Patent No.: US 8,467,452 B2
(45) Date of Patent: Jun. 18, 2013

(54) DISTRIBUTING CANDIDATE VECTORS BASED ON LOCAL MOTION COMPLEXITY

(75) Inventor: Erwin Bellers, Fremont, CA (US)

(73) Assignee: Entropic Communications, Inc., San Diego, CA (US)

( * ) Notice: Subject to any disclaimer, the term of this patent is extended or adjusted under 35 U.S.C. 154(b) by 485 days.

(21) Appl. No.: 10/585,443

(22) PCT Filed: Jan. 4, 2005

(86) PCT No.: PCT/IB2005/050013
§ 371 (c)(1),
(2), (4) Date: Mar. 20, 2008

(87) PCT Pub. No.: WO2005/069633
PCT Pub. Date: Jul. 28, 2005

(65) Prior Publication Data
US 2009/0207313 A1      Aug. 20, 2009

Related U.S. Application Data

(60) Provisional application No. 60/535,722, filed on Jan. 8, 2004.

(51) Int. Cl.
*H04N 7/12*      (2006.01)
*H04N 11/02*     (2006.01)
*H04N 11/04*     (2006.01)
*H04N 5/14*      (2006.01)
*H04N 9/64*      (2006.01)
*H03M 7/34*      (2006.01)
*G01N 21/25*     (2006.01)

(52) U.S. Cl.
USPC ............... 375/240.16; 375/240.24; 341/51; 348/571; 356/407

(58) Field of Classification Search
USPC .................................................. 375/240.16
See application file for complete search history.

(56) References Cited

U.S. PATENT DOCUMENTS 5,355,221 A * 10/1994 Cohen et al. ............... 356/497
5,959,689 A *  9/1999 De Lange et al. ........... 348/571
(Continued)

FOREIGN PATENT DOCUMENTS

CN      1178057       4/1998
JP      07-336726    12/1995
(Continued)

OTHER PUBLICATIONS

Fan, "Efficient Motion Estimation Algorithm Based on Structure Structure Segmentation and Compensability Analysis", Opt. Eng. 37(5), 1998, pp. 1563-1570.*

(Continued)

*Primary Examiner* — Christopher S Kelley
*Assistant Examiner* — Hee-Yong Kim
(74) *Attorney, Agent, or Firm* — Bruce Greenhaus; Richard Bachand; Duane Morris LLP

(57) ABSTRACT

A system and method for distributing candidate motion vectors divides a picture frame (110) into a plurality of segments (120), where each segment (120) includes a plurality of pixel blocks (130). The local motion complexity of each segment may then be measured by determining a Sum-of-Absolute Differences (SAD) between pixel blocks (130) of the frame (110a) and pixel blocks (130)of an adacent frame (110b) and summing the SAD values for the pixel blocks (130) within each segment (120). The maximum, minimum and average SAD value for the segments may be used to define a distribution function that distributes candidate vectors to conform with a desired maximum, minimum and average number of candidate vectors per block. This distribution function is then used to determine the number of candidate vectors to assign to pixel blocks (130) based on the measured SAD value of the associated segment (120).

6 Claims, 2 Drawing Sheets

U.S. PATENT DOCUMENTS

| | | | |
|---|---|---|---|
| 5,978,030 | A | 11/1999 | Jung et al. |
| 6,081,209 | A * | 6/2000 | Schuyler et al. ............... 341/51 |
| 6,490,320 | B1 | 12/2002 | Vetro et al. |
| 2003/0006723 | A1 | 1/2003 | Sul et al. |
| 2003/0142749 | A1* | 7/2003 | Hong ..................... 375/240.16 |
| 2005/0041742 | A1* | 2/2005 | Abe et al. ................ 375/240.24 |
| 2007/0132424 | A1 | 6/2007 | Takao et al. |

FOREIGN PATENT DOCUMENTS

| | | |
|---|---|---|
| JP | 09-327022 | 12/1997 |
| JP | 2000-152244 | 5/2000 |
| JP | 2002-165109 | 6/2002 |

OTHER PUBLICATIONS

Feng J et al: "Adaptive Block Matching Motion Estimation Algorithm for Video Coding"; Electronics Letters, IEE Stevenage; GB; vol. 31, No. 18; Aug. 31, 1995; pp. 1542-1543.

Choon-Hoon Lee et al: "A New Block-Matching Algorithim Based on an Adaptive Search Area . . ."; Consumer Electronics; 1999 ICCE International Conf. on Los Angeles CA; USA Jun. 22-24, 1999; pp. 362-363.

Kossentini F et al: "Predictive RD Optimized Motion Estimation for Very Low Bit-Rate Coding"; IEEE Jounal on Selected Areas in Communications; IEEE Inc. N.Y. US; vol. 15, No. 9; Dec. 1997; pp. 1752-1763.

Ahmed, Arshad et al.: "Content Adaptive Motion Estimation for Mobile Video Encoders", ISCAS 2001, Proceedings of the 2001 IEEE International Symposium on Circuits and Systems, Sydney, Australia, May 6-9, 2001; IEEE International Symposium on Circuits and Systems, New York, NY, IEEE, US, vol. 1 of 5, (May 6, 2001) pp. 237-240.

Bellers, E.B. et al.: "De-interlacing—A Key Technology for Scan Rate Conversion", Advances in Image Communications; vol. 9; Oct. 2000; pp. 1-352.

De Haan, Gerard et al.: "True-Motion Estimation With 3-D Recursive Search Block Matching", IEEE Transactions on Circuits and Systems for Video Technology, vol. 3, No. 5; Oct. 1993; pp. 368-379.

Schu, Markus, et al.: "System on Silicon-IC for Motion Compensated Scan Rate Conversion, Picture-In-Picture Processing, Split Screen Applications and Display Processing", IEEE Transactions on Consumer Electronics; vol. 45, No. 3; Aug. 1999; pp. 842-850.

Jung-Ik Ha et al., "Sensorless Position Control and Initial Position Estimation of an Interior Permanent Magnet Motor", Conference Record of the 2001 IEEE Industry Applications Conference, Sep. 30, 2001-Oct. 4, 2001, pp. 2607-2613, vol. 4, New York, NY, XP010562048, ISBN: 978-0-7803-7114-9.

Jung-Ik Ha et al., "Sensorless rotor Position Estimation of an Interior Permanent-Magnet Motor from Initial Sates", IEEE Transactions on Industry Applications, May 2003, pp. 761-767, vol. 39, No. 3, XP011096855, ISSN: 0093-9994.

Jiangang Hu et al., "Eddy Current Effects on Rotor Position Estimation and Magnetic Pole Identification of PMSM at Zero and Low Speeds", IEEE Transactions on Power Electronics, Sep. 1, 2008, pp. 2565-2575, vol. 23, No. 5, XP011239128, ISSN: 0885-8993.

Nicola Bianchi et al., "Advantages of Inset PM Machines for Zero-Speed Sensorless Position Detection", IEEE Transactions on Industry Applications, Jul. 1, 2008, pp. 1190-1198, vol. 44, No. 4, XP011231786, ISSN: 0093-9994.

* cited by examiner

DISTRIBUTING CANDIDATE VECTORS BASED ON LOCAL MOTION COMPLEXITY

CROSS REFERENCE TO RELATED APPLICATION

This application claims the benefit of U.S. provisional application Ser. No. 60/535,722 filed Jan. 1, 2004, which is incorporated herein whole by reference.

The present invention generally relates to video processing applications, and more particularly, to systems and methods for distributing candidate vectors based on local motion complexity.

For high quality video processing applications, motion estimation is typically used to perform a wide variety of beneficial functionalities, such as scan rate conversion, noise reduction, content encoding, and compression. In this regard, various motion estimation techniques have been developed to compensate for different characteristics of the video signal, different types of motion, and different objectives of the particular video processing application.

These motion estimation techniques typically estimate motion for a block of pixels by evaluating a limited set of so-called candidate motion vectors. For each block of pixels, the motion estimation technique selects candidate vectors from a 3-D neighborhood by selecting from among the detected motion vectors that are offset in the spatial and/or temporal domains. For example, candidate vectors may include one or more spatially offset motion vectors within the same frame and one or more temporally offset motion vectors within a previous or subsequent frame. Additional "special" candidate vectors can also be used to take into account updated motion vectors or to compensate for zero motion, such as static text. In any event, the number of candidate vectors that are evaluated per block of pixels are typically fixed and predefined by the particular motion estimation technique. Every region, whether easy or difficult, is evaluated using the same number of candidate vectors.

Although fixing the number of candidate vectors simplifies the hardware and software implementation, these approaches can produce sub-optimal results. For example, in order to efficiently utilized limited computational resources and memory bandwidth, motion estimation should ideally adapt to the complexity of scene and the local content such that more emphasis is placed on picture regions that are difficult to estimate, while less emphasis is placed on regions that are easy to estimate (e.g. backgrounds with uniform motion). It has also been shown that evaluating many candidate vectors in picture regions with uniform (converged) motion can introduce annoying distortion into the video signal, and therefore do more harm than good. By using a fixed number of pre-defined candidate vectors, existing motion estimation techniques can produce an inefficient or undesirable allocation of limited resources.

Therefore, in light of the foregoing problems, there is a need for systems and methods that efficiently distribute candidate motion vectors based on local motion complexity. These systems and methods would preferably be used to improve the allocation of limited resources in video processing applications that employ a motion estimation technique.

Embodiments of the present invention alleviate many of the foregoing problems by providing systems and method for distributing candidate vectors based on local motion complexity. In one embodiment, a picture frame is divided into a plurality of segments, where each segment includes a plurality of pixel blocks. The local motion complexity of each segment may then be measured by, for example, determining a Sum-of-Absolute Differences (SAD) between pixel blocks of the frame and pixel blocks of an adjacent frame and summing the SAD values for the pixel blocks within each segment. The number of candidate vectors assigned to each block may then be determined based on the measured local motion complexity.

Other embodiments provide mechanisms for assigning the number of candidate vectors to each pixel block. In one embodiment, for example, a distribution function for distributing candidate vectors may be determined using a maximum, minimum and average SAD value for the segments within the picture frame. The distribution function may also use predetermined values for the maximum, minimum and average number of candidate vectors per block such that the distribution function achieves a desired distribution of candidate vectors. In this way, the distribution function will distribute a higher number of candidate vectors to pixel blocks within segments having a higher SAD value (high motion complexity) and a lower number of candidate vectors to pixel blocks within segments having a lower SAD value (low motion complexity). This non-uniform distribution of the number of candidate vectors can ensure that resources are re-directed to portions of the picture where such resources are needed.

These and other features and advantages of the present invention will become more apparent to those skilled in the art from the following detailed description in conjunction with the appended drawings in which.

Figure 1:
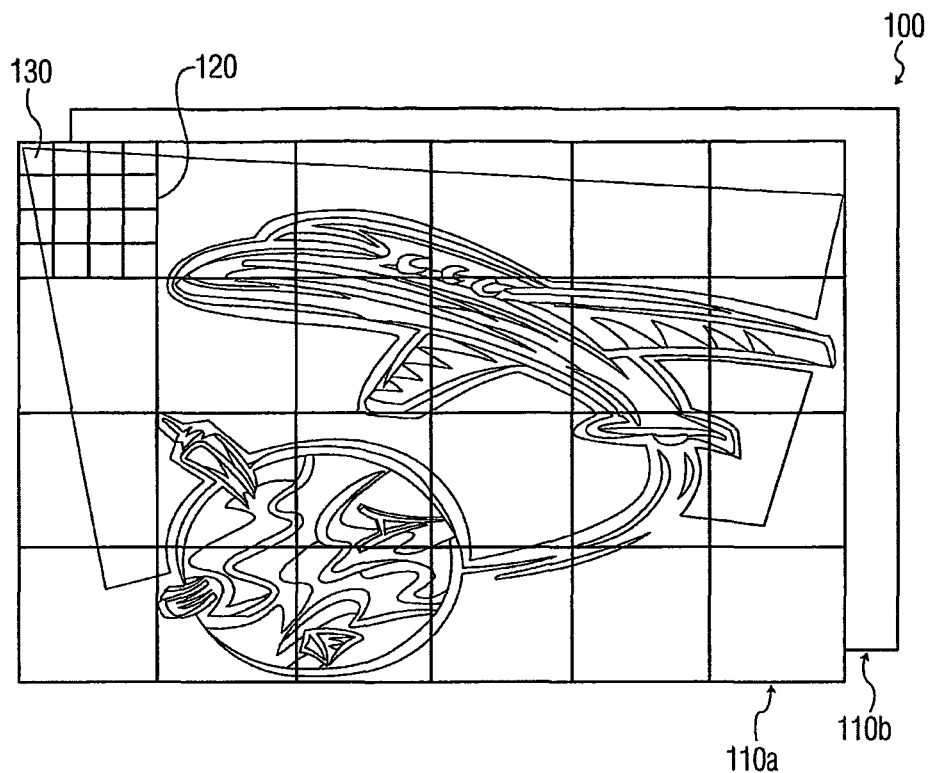
FIG. 1 illustrates an exemplary picture frame in accordance with one embodiment of the present invention.

Embodiments of the present invention provide systems and methods for distributing candidate motion vectors based on local motion complexity. The following description is presented to enable a person skilled in the art to make and use the invention. Descriptions of specific applications are provided only as examples. Various modifications, substitutions and variations of the preferred embodiment will be readily apparent to those skilled in the art, and the generic principles defined herein may be applied to other embodiments and applications without departing from the scope of the invention. Thus, the present invention is not intended to be limited to the described and illustrated embodiments, and should be accorded the widest scope consistent with the principles and features disclosed herein.

Embodiments of the present invention may be used to efficiently allocate limited computational resources to different portions of the picture frame without sacrificing motion estimation quality. In one embodiment, each picture frame is divided into a plurality of segments, where each segment includes a plurality of pixel blocks. The number of candidate vectors evaluated for pixel blocks within each segment may then be determined based on an estimation of the relative motion complexity of each corresponding segment. As such, the pixel blocks within the same segment are allocated the same number of candidate vectors, but pixel blocks within different segments could be allocated a different number of candidate vectors depending on the relative motion complexity of the different segments. This approach creates a non-uniform distribution of candidate motion vectors (and associated computational resources used in their evaluation) for different groups of pixel blocks based on the relative motion complexity within each group.

In order to estimate the relative motion complexity of each segment, the Sum-of-Absolute-Differences (SAD) between pixels of a frame and corresponding pixels of an adjacent frame may be calculated, where the corresponding pixels of the adjacent frame may be spatially aligned or spatially offset in accordance with a candidate motion vector. Because the SAD value in this case calculates the sum of the absolute value of differences of pixels between blocks of adjacent frames, the SAD value of each segment provides the mismatch error of the blocks within the segment, and therefore, can be used as an indirect measure of the motion complexity of each segment. If a segment has a high SAD value, then the segment likely has high motion complexity, and therefore the pixel blocks within the segment may benefit from a greater number of candidate motion vectors. If a segment has a low SAD value, then the segment likely has low motion complexity, and therefore, it may be more efficient to allocate a lower number of candidate vectors to the pixel blocks within that segment. By distributing a higher or lower number of candidate vectors based on the relative motion complexity of each segment, limited computational resources can be non-uniformly distributed over different portions of the picture based on relative need.

Referring to FIG. 1, an exemplary picture frame in accordance with one embodiment of the present invention is illustrated generally at 100. As illustrated, the exemplary frame 110 is divided into twenty-four picture segments 120, where each segment 120 includes sixteen 8×8 pixel blocks 130. For purposes of clarity, the pixel blocks 130 are only illustrated for the first segment 120. It is understood that the exemplary frame of FIG. 1 is provided for illustration purposes only and that other subdivisions of the picture frame are contemplated and embraced by the present invention.

In order to estimate the motion complexity for each segment 120, a SAD value is calculated between pixels blocks 130 of one frame 110a and corresponding pixel blocks 130 of an adjacent frame 110b. In this context, it is understood that the corresponding pixel blocks 130 of the adjacent frame 110b could be spatially aligned with the pixel blocks 130 of the current frame 110a. Alternatively, the corresponding pixel blocks 130 of the adjacent frame 110b could be spatially offset with respect to pixel blocks 130 in the current frame 110a based on an estimated motion vector that is determined using a limited set of candidate motion vectors. Accordingly, for embodiments of the present invention, the corresponding pixel blocks 130 of adjacent frames 110b could be spatially aligned or spatially offset with respect to the pixel blocks of the current frame 110a.

Since each segment 120 includes a plurality of pixel blocks 130, the SAD values for each target segment 120 can be determined by summing the SAD values for the individual pixel blocks 130 within the target segment 120. As such, the SAD value for each segment 120 provides an estimate of mismatch error between the pixel blocks 130 within each segment 120, and therefore, an estimate of the local motion complexity of each segment 120.

Once the SAD value for each segment 120 has been determined, a distribution function can be used to determine the number of candidate vectors to be evaluated for pixel blocks 130 within each segment 120 to produce a desired distribution of candidate vectors. For example, suppose that there are sufficient resources to evaluate on average N_av number of candidates motion vectors for all the blocks 130 within a frame 110. Further suppose that it is desired to limit the number of candidate vectors to be evaluated to N_max and N_min for the maximum and minimum number of candidates per block 130, respectively. A distribution function for candidate vectors may then be determined by applying the following rules: (1) evaluate N_min number of candidate vectors for pixel blocks 130 within segments that have the lowest match error (lowest SAD); (2) evaluate N_max number of candidate vectors for pixel blocks 130 within segments that have the highest match-error (highest SAD); and (3) evaluate on average N_av number of candidate vectors per block for the blocks 130 within segments that have the average match-error. Based on these rules, the following exemplary equations would apply:

$$N\_min = a + b*SAD\_min + c*SAD\_min*SAD\_min \quad (1)$$

$$N\_max = a + b*SAD\_max + c*SAD\_max*SAD\_max \quad (2)$$

$$N\_av = a + b*SAD\_av + c*SAD\_av*SAD\_av \quad (3)$$

In equations (1)-(3), SAD_max, SAD_min and SAD_av correspond to the maximum, minimum and average SAD values, respectively, of all segments within the targeted frame. Furthermore, N_max, N_min and N_av can be predetermined values for the maximum, minimum and average number of candidate vectors, respectively, that produce a desired distribution of candidate vectors among the pixel blocks. In a preferred embodiment, N_max is 9; N_min is 4; and N_av is 6.

If equations (1)-(3) above are solved simultaneously to determine the values of a, b and c, the following equation can be used to determine the number of candidate vectors to be evaluated within each segment based on the segment's corresponding SAD value:

$$N\_cand_i = a + b*SAD_i + c*SAD_i*SAD_i, \quad (4)$$

where $N\_cand_i$ is the number of candidate vector to be evaluated for pixel blocks within the i-th segment, and $SAD_i$ is the SAD value for the i-th segment. By using equation (4) to determine the number of candidate vectors, the available number of motion vectors to evaluate can be distributed over the various pixel blocks according to the local motion complexity of each segment, i.e. the resources are spend at the locations where they are needed. The distribution function of equation (4) also allocates the number of candidate vectors such that distribution of candidate vectors conforms with the desired distribution (e.g., if $SAD_i$=SAD_max, then N_cand$_i$=N_max; if $SAD_i$=SAD_min, then N_cand$_i$=N_min; and so forth).

In comparison to schemes that use a fixed number of motion candidates per pixel block, the presented scheme can help to: (1) provide an improved motion estimation quality with the same total number of candidate vectors, and/or (2) provide a similar motion estimation quality with a fewer number of candidate vectors. For those skilled in the art, it is obvious that other sets of equations can be used and a different expression can be resolved to arrive at a (different) distribution function. The presented set of distribution equations is just an example. Moreover, different or multiple measurements of local motion complexity can be taken into account. For example, instead of using SAD values, embodiments of the present invention could use another estimate of mismatch error, such as Mean-Squared Error (MSE), without departing from the principles of the present invention.

Figure 2:
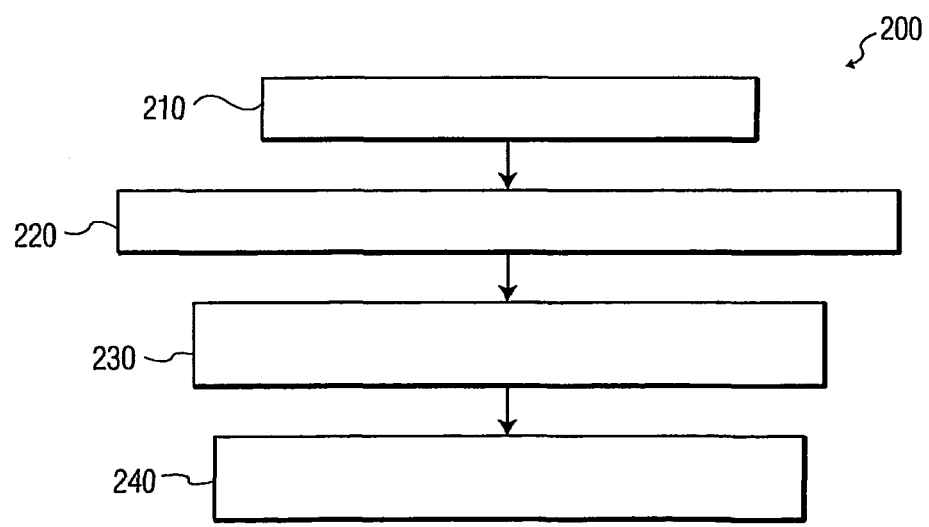
FIG. 2 illustrates an exemplary method in flowchart form for distributing candidate vectors in accordance with one embodiment of the present invention.

Referring to FIG. 2, an exemplary method in flowchart form for distributing candidate vectors in accordance with one embodiment of the present invention is illustrated generally at 200. As illustrated, the exemplary method measures the local motion complexity at step 210 by, for example, measuring SAD or MSE values for a plurality of pixel blocks and summing the SAD or MSE values for a group of pixel blocks.

A distribution function for determining the number of candidate vectors assigned to each pixel block is then determined at step 220. This process may involve developing a set of distribution equations, such as equations (1)-(4) above, that define a desired distribution of candidate vectors based on the measured local motion complexity. These equations may include one or more anchor values, such a maximum, minimum or average value for the measured motion complexity.

At step 230, the number of candidate vectors to be evaluated for each pixel block is determined using, for example, the distribution function of equation (4) and the measured local complexity of the pixel blocks. Motion estimation for the applicable video frame may then be performed at step 240 using the number of candidate vectors assigned to each pixel block. It should be noted that the motion estimation technique should take into account the fact that a different number of candidate vectors may be assigned to different pixel blocks. for example, if the candidate vectors that could be evaluated include one or more spatial vectors, one or more temporal vectors, an update (modified motion) vector, a global motion vector, and a zero motion vector, the motion estimation technique may assign a priority order to each type of candidate vector. If the number of candidate vectors assigned to a pixel block is insufficient to evaluate all the possible candidate vectors, the motion estimation technique can then select from among the types of candidate vectors based on the vectors' relative priority. In this way, the most relevant motion vectors would be evaluated for pixel blocks that are assigned a relatively small number of candidate vectors. Furthermore, if the number of candidate vectors are selected such that a smaller number of candidate vectors are assigned to pixel blocks with relatively simple motion complexity, this limited set of motion vectors may be sufficient to compensate for the motion involved without sacrificing motion estimation quality.

Figure 3:
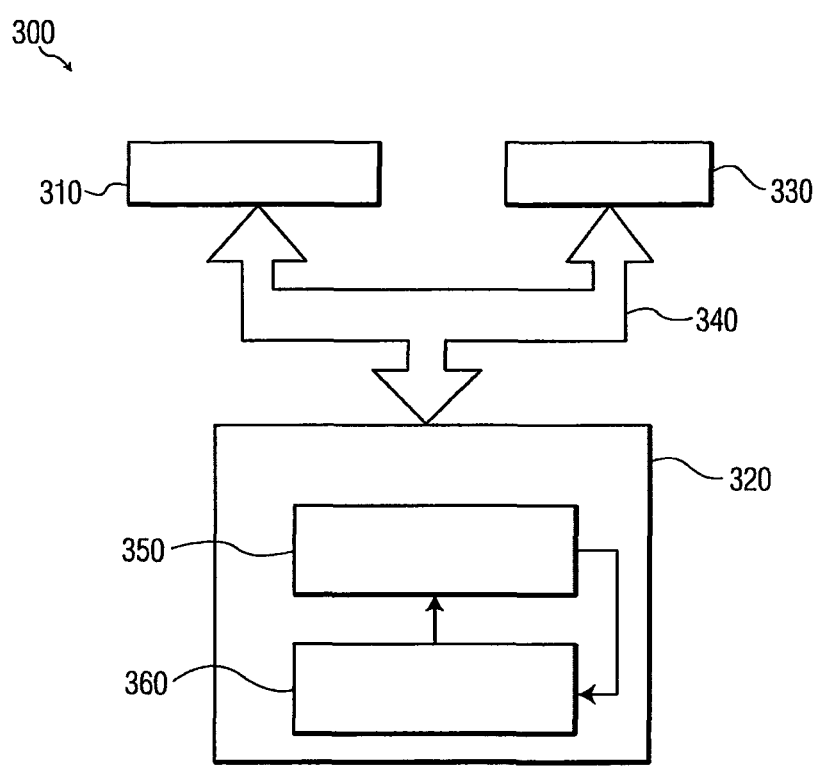
FIG. 3 illustrates an exemplary platform that may be used in accordance with embodiments of the present invention.

Referring to FIG. 3, an exemplary platform that may be used in accordance with embodiments of the present invention is illustrated generally at 300. As illustrated, the exemplary platform includes a microprocessor 310 operably coupled to a memory system 320 via a system bus 340. The memory system may comprise a random access memory, a hard drive, floppy drive, a compact disk, or other computer readable medium, that stores computer instructions for a motion estimation module 350 and video processing application 150. The exemplary system also includes an I/O interface 330 that is coupled to the microprocessor 310 and the memory system 320 in order to enable the system to input and output video signals.

In operation, the video processing application 360 uses the motion estimation module 350 to process video signals received from the I/O interface 330 and to output the processed video signal to the I/O interface 330. If the motion estimation module 350 is implemented in accordance with the principles described above, the exemplary system may be configured to efficiently utilize the limited processing resources of the microprocessor 310 and the limited memory bandwidth of the memory system 350 without sacrificing motion estimation quality. Furthermore, if the motion estimation module 350 and/or video processing application 360 are implemented in hardware or combinations of hardware and software (instead of the software only implementation illustrated in FIG. 3), other embodiments of the exemplary system would provide the system designer flexibility in designing the optimal configuration.

While the present invention has been described with reference to exemplary embodiments, it will be readily apparent to those skilled in the art that the invention is not limited to the disclosed and illustrated embodiments but, on the contrary, is intended to cover numerous other modifications, substitutions and variations and broad equivalent arrangements that are included within the scope of the following claims.

What is claimed is:

1. A method for distributing candidate motion vectors, the method comprising:
    dividing a picture frame into a plurality of segments using a processor, each segment comprising a plurality of pixel blocks;
    measuring local motion complexity for each segment using the processor; and
    assigning a number of candidate motion vectors to pixel blocks within each segment based on the measured local motion complexity using the processor, wherein the number of candidate motion vectors assigned to pixel blocks within one of the segments is different from the number of candidate motion vectors assigned to pixels blocks within another one of the segments,
    wherein the measuring local motion complexity further comprises:
        determining a sum-of-absolute differences between pixel blocks of the picture frame and corresponding pixel blocks of an adjacent frame; and
        summing the measured sum-of-absolute differences associated with of pixel blocks within each segment,
    wherein the assigning further comprises using a distribution function configured to assign the number of candidate vectors based on the measured local motion complexity of each segment, and
    wherein the distribution function is based on a maximum, minimum or average of the measured sum-of-absolute differences (SAD) of the segments using the following respective relationships:

$N\_max = a + b*SAD\_max + c*SAD\_max*SAD_{13}max,$ $N\_min = a + b*SAD\_min + c*SAD\_min*SAD\_min,$
    and $N\_av = a + b*SAD\_av + c*SAD\_av*SAD\_av.$ 2. The method of claim 1, wherein the distribution function is further based on predetermined values for a maximum, minimum or average number of candidate vectors per block.

3. The method of claim 1, further comprising performing motion estimation on the pixel blocks using the number of candidate vectors assigned to each pixel block.

4. A system for distributing candidate vectors, the system comprising a processor configured for:
    dividing a picture frame into a plurality of segments, each segment comprising a plurality of pixel blocks;
    measuring local motion complexity for each segment; and
    assigning a number of candidate motion vectors to pixel blocks within each segment based on the measured local motion complexity, wherein the number of candidate motion vectors assigned to pixel blocks within one of the segments is different from the number of candidate motion vectors assigned to pixels blocks within another one of the segments,
    wherein the measuring local motion complexity comprises:
        determining a sum-of-absolute differences between pixel blocks of the picture frame and corresponding pixel blocks of an adjacent frame; and
        summing the measured sum-of-absolute differences associated with of pixel blocks within each segment, wherein assigning comprises using a distribution function configured to assign the number of candidate vectors based on the measured local motion complexity of each segment, and wherein the distribution function is based on a maximum, minimum or average of the measured sum-of-absolute differences (SAD) of the segments using the following respective relationships:

$$N\_max = a + b*SAD\_max + c*SAD\_max*SAD\_max,$$

$$N\_min = a + b*SAD\_min + c*SAD\_min*SAD\_min, \text{ and}$$

$$N\_av = a + b*SAD\_av + c*SAD\_av*SAD\_av.$$

5. The system of claim 4, wherein the distribution function is further based on predetermined values for a maximum, minimum, or average number of candidate vectors per block.

6. The system of claim 4, wherein the processor is further configured for performing motion estimation on the pixel blocks using the number of candidate vectors assigned to each pixel block.

* * * * *